July 18, 1961 J. R. GOODYKOONTZ, JR 2,992,475
ELECTRONIC COMPONENT MODULE ASSEMBLY APPARATUS
Filed July 31, 1958 9 Sheets-Sheet 2

James R. Goodykoontz, Jr.,
INVENTOR.
BY.

AGENT.

July 18, 1961  J. R. GOODYKOONTZ, JR  2,992,475
ELECTRONIC COMPONENT MODULE ASSEMBLY APPARATUS
Filed July 31, 1958  9 Sheets-Sheet 3

James R. Goodykoontz, Jr.,
INVENTOR.
BY.
AGENT.

July 18, 1961 J. R. GOODYKOONTZ, JR 2,992,475
ELECTRONIC COMPONENT MODULE ASSEMBLY APPARATUS
Filed July 31, 1958 9 Sheets-Sheet 4

James R. Goodykoontz, Jr.,
*INVENTOR.*

BY.

AGENT.

July 18, 1961    J. R. GOODYKOONTZ, JR    2,992,475
ELECTRONIC COMPONENT MODULE ASSEMBLY APPARATUS
Filed July 31, 1958    9 Sheets-Sheet 5

James R. Goodykoontz, Jr.,
INVENTOR.

BY.

AGENT.

July 18, 1961   J. R. GOODYKOONTZ, JR   2,992,475
ELECTRONIC COMPONENT MODULE ASSEMBLY APPARATUS
Filed July 31, 1958   9 Sheets-Sheet 7

James R. Goodykoontz, Jr.,
INVENTOR
BY.

AGENT.

July 18, 1961    J. R. GOODYKOONTZ, JR    2,992,475
ELECTRONIC COMPONENT MODULE ASSEMBLY APPARATUS
Filed July 31, 1958    9 Sheets—Sheet 9

James R. Goodykoontz, Jr.,
INVENTOR.
BY.

AGENT.

United States Patent Office

2,992,475
Patented July 18, 1961

2,992,475
ELECTRONIC COMPONENT MODULE ASSEMBLY APPARATUS
James R. Goodykoontz, Jr., Santa Monica, Calif., assignor to Hughes Aircraft Company, Culver City, Calif., a corporation of Delaware
Filed July 31, 1958, Ser. No. 752,240
15 Claims. (Cl. 29—203)

The present invention relates in general to machines for assembling electronic circuits and more particularly to a machine and process that automatically collects electronic components and positions them in a desired pattern, the electronic components then being automatically assembled in sandwich form between parallel printed circuit boards.

The sandwich or cordwood technique of mounting electronic components, such as resistors, capacitors, diodes and the like, involves mounting the components perpendicularly between two or more parallel printed circuit boards. More particularly, the boards have holes drilled therethrough, the holes through one board corresponding in their positions on the board to the holes of the other one or more boards. When the boards are positioned parallel to each other and aligned, the components are strung between the boards, the axial leads on one side of the components being inserted through the holes in one board and the axial leads on the other side of these components being inserted through the holes in the other board. The components are then soldered in the circuitry on the boards, the solder firmly holding the components in place. The final assembly resembles a sandwich, with components stacked like cordwood, hence the reference to the technique as the sandwich or cordwood technique.

It is generally recognized by those skilled in the miniaturization art that cordwood type assemblies of electronic components permit much higher component densities to be achieved than do the more conventional methods of mounting components on a flat etched board. However, although the advantages of such a method have been implicitly recognized, the cordwood technique has not been generally adopted because of the difficulty and expense of assembling the components. More specifically, it has been necessary in the past, in the main, to insert the component leads through the holes in the boards by hand. This is obviously a tedious, painstaking, time consuming, inaccurate and expensive step. Some machines for doing the job are commercially available but they have proven to be inefficient in their operation and their cost has been extremely high.

Accordingly, it is therefore apparent that, even though the sandwich or cordwood type circuit modules are advantageous for use in connection with many types of electronic circuit assemblies, in high production situations, only an automatic assembly apparatus for such modules will permit assembly thereof at a cost that is competitive with other types of circuit assemblies. Various specific problems have existed in structures of this type and the assembly thereof in connection with automatic selection of a particular component for disposition in a particular position in the module. The retention of the components in a three dimensional aspect, precise location of axially extending component leads and the automatic assembly of printed circuit boards on the leads have also been problems in automatic assembly apparatus therefor.

Prior devices intended for assembly of sandwich or cordwood type circuit modules have taken the form of manually operated structures that are satisfactory for low production situations but still required many hand operations in connection with the establishment of individual components between parallel circuit boards. The extensive manual handling of the components has also caused slight bending of component leads, thus to present further problems in connection with the disposition of such leads through the aligned circuit board openings. When handling a group of components arranged in a three dimensional manner and in attempting to dispose a circuit board in such a manner as to position the leads of all of the components in appropriate boards, misalignment of any one component lead will cause difficulty in the assembly and considerable time consumption in straightening and realigning the deformed individual lead.

It is accordingly one important object of this invention to provide an automatic assembly apparatus for sandwich or cordwood types of electronic circuit modules.

It is another important object of the invention to provide an automatic assembly apparatus for electronic circuit modules of the cordwood or sandwich types and wherein means are provided for automatically aligning axial leaded components in three dimensions.

Still another object of the invention is to provide an apparatus for assembling cordwood or sandwich types of electronic circuit modules wherein means are provided for first precisely aligning component leads in two dimensions and thereafter automatically positioning printed circuit boards in association with the component leads.

A still further object of the invention is to provide a component collecting and transport mechanism for use in an automatic assembly apparatus for sandwich or cordwood type circuit modules.

Other and further important objects of the invention will become apparent from the disclosures of the following detailed specification, appended claims and accompanying drawings, wherein:

With reference to the drawings, the automatic assembly apparatus of this invention includes generally a base frame structure 30, a component collector 31, a component dispensing mechanism 32 and a component collector receiving and alignment station 33.

In general, electronic components such as resistors, diodes, capacitors and the like of the axial leaded variety are dispensed from suitable mechanisms at selected times, carried from the mechanisms to specific vertical levels, deposited in the collector 31 and moved through the apparatus in an aligned manner both vertically, longitudinally and laterally. Thereafter, the components are precisely aligned in the component collector receiving station 33 and printed circuit boards are disposed over protruding ends of the component leads. Thereafter, the collector mechanism with the assembled electronic module are dispensed from the apparatus. While various mechanisms are shown as operatively associated with the apparatus described thus far, it is to be understood that such associated mechanism for handling the components, a plurality of component collectors and assembled modules are by way of example only and form no part of the present invention. In other words, the present invention is directed primarily to the assembly apparatus including means for dispensing electronic components, retaining such components in three dimensional alignment, automatic establishment of printed circuit boards over extended ends of component leads and thereafter dispensing the completely assembled electronic module from the assembly machine.

Figures 1, 2:
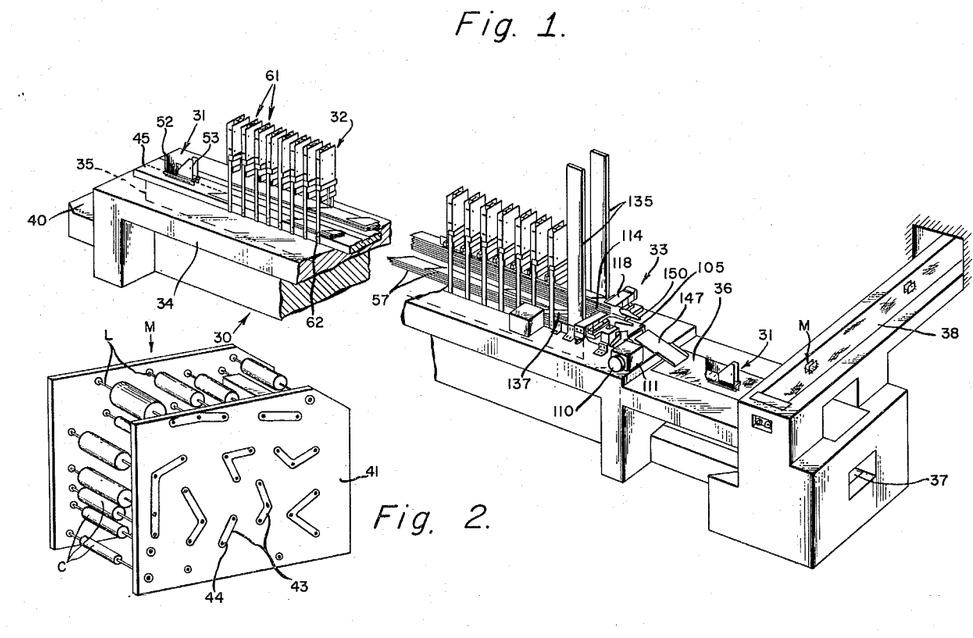
FIGURE 1 is a perspective view, partially diagrammatic, showing the automatic circuit module assembly apparatus of the present invention.
FIG. 2 is a perspective view showing a typical form of cordwood or sandwich type electronic circuit module that may be assembled by the apparatus of this invention.

With reference to FIG. 1, it is to be noted that the frame structure 30 includes a base 34 that serves to house a continuous moving chain or the like 35. Details of the chain support and method for continuously moving the chain have been omitted for clarity, such mechanism being generally known and understood in the art. The frame structure further includes a pair of continuously moving conveyor belts 36 and 37, with the completed components along with the collector 31 being adapted for delivery from the station 33 to the belt 36. An operator thereafter removes the completed module from the collector 31 and may place this module, indicated at M, on a third laterally disposed belt mechanism 38 for delivery thereby to a following station wherein the component leads may be soldered to the printed circuits carried by the circuit board through use of a machine, for example, of the type disclosed in a copending application of Russell C. Frank, Serial Number 732,234, filed May 1, 1958. The collector 31 may thereafter be disposed by the operator on the belt conveyor 37 and returned to a platform 40 on an opposite end of the machine where another operator may dispose the collector in position for retravel through the automatic assembly apparatus.

A completed type of cordwood module is shown in FIG. 2, it being understood that this particular type of module is shown by way of example only and that the circuit boards employed therewith may be of a variety of shapes having various numbers of components and different types of printed circuits on the circuit boards. As shown, the module M of FIG. 2 includes circuit boards 41 and 42 having printed circuits 43 thereon and components C disposed therebetween. Leads L of the components are adapted to extend through suitable openings 44 in the boards 41 and 42, these openings 44 being associated with the printed circuits 43. The leads are thereafter soldered in position relative to the circuit 43 and protruding ends are suitably trimmed, thus to present modules of the type shown in FIG. 2.

Figure 3:
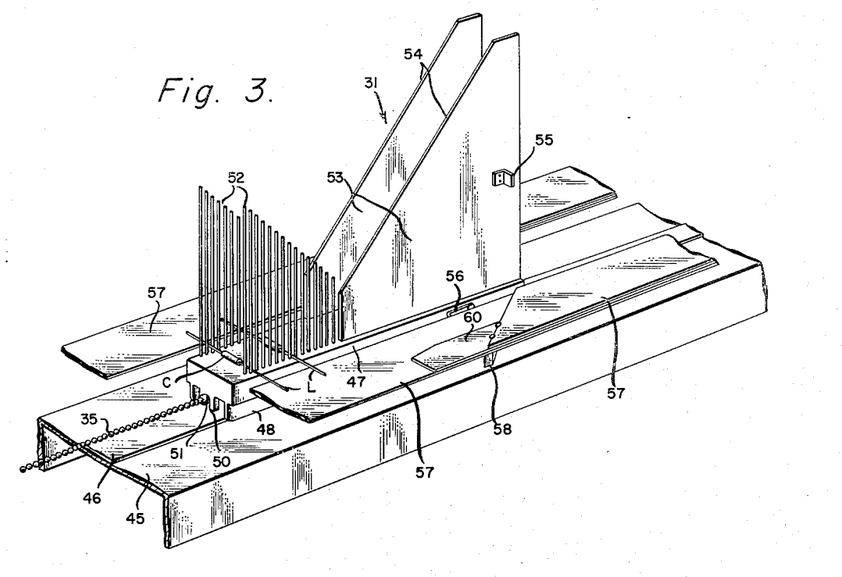
FIG. 3 is an enlarged fragmentary isometric view showing the component transport apparatus and position establishment mechanism utilized in the present invention.
Figure 4:
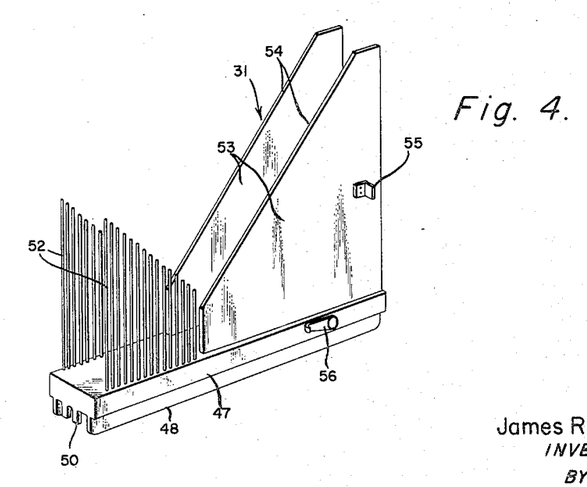
FIG. 4 is an isometric view of the movable component collector mechanism employed herewith.

With reference to FIGS. 1, 3 and 4, a channel shaped rail member 45 is positioned on the base structure 34. The member 45 has a planar upper surface, there being an elongated rectangular guide member 46 positioned longitudinally on and secured to the rail member 45 in the central area thereof. The collector 31 is adapted for disposition on the upper surface of the rail member 45 and is laterally located thereon by association with the guide member 46.

The collector 31 includes an elongated base 47 (see FIG. 4) having downwardly projecting integral guide portions 48 and an integral bifurcated tab 50 disposed downwardly from a trailing end of the base and intermediate the guide portions 48. The tab 50 is adapted for disposition about the chain 35, an enlarged element 51, carried by a chain at intervals therealong, being adapted for engagement therewith, thus to provide means to move the collector 31 in a continuous manner through the machine. The collector 31 further includes a plurality of spaced vertically extending rods 52 that are arranged in spaced parallel rows and carried by the collector base 47. The upper ends of the rods 52 are arranged in a downwardly stepped manner for a purpose to be hereinafter more fully described. The collector 31 further includes a pair of vertically disposed parallel plates 53 that are positioned in coextensive alignment with the rows of rods 52. The plates 53 have angularly disposed, aligned edges 54 also for a purpose to be hereinafter more fully described. One of the plates 53 has a lug 55 disposed therefrom that operates in conjunction with a component dispensing mechanism, and the base 47 has a hook shaped catch member 56 positioned on one side thereof, the lug 55 and catch member 56 to be described hereinafter in detail in connection with other mechanism of this assembly machine.

As shown primarily in FIG. 3, as the components C are disposed between the laterally aligned rods 52, the leads L thereof are adapted for disposition on upper surfaces of a pair of elongated, vertical position establishing plates 57 that are supported on pedestals 58 and maintained in vertical spaced relationship by elongated spacers 60. The vertical spacing between the plates 57 is similar to the longitudinal spacing between the rods 52. As will be described hereinafter, the components C are positioned in such a manner as to be located longitudinally between pairs of rods 52 in the rows of such rods, and are maintained vertically by disposition of the leads L on one of the pairs of plates 57. The plates 57 and pedestals 58 are carried by the rail 45 and positioned laterally on each side of the elongated guide 46.

Figure 5:
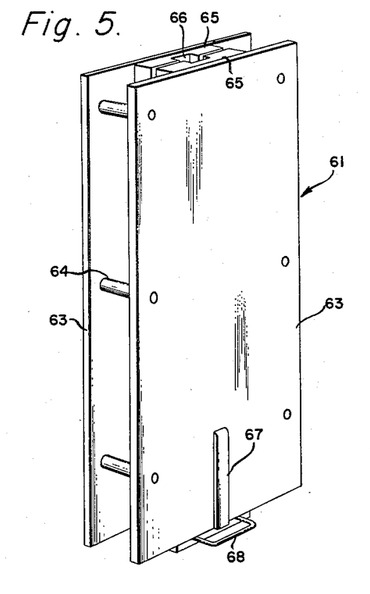
FIG. 5 is a perspective view of a component magazine employed herewith.
Figure 6:
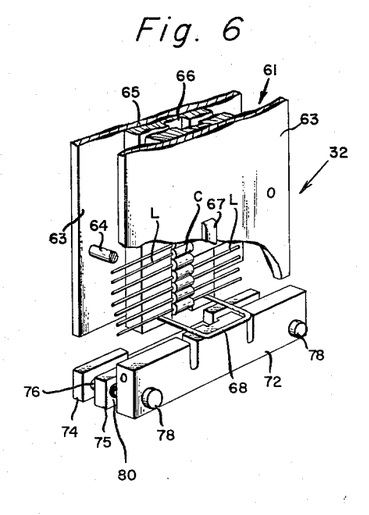
FIG. 6 is a fragmentary perspective view, partially in section, showing details of a lower end of a component magazine.
Figure 7:
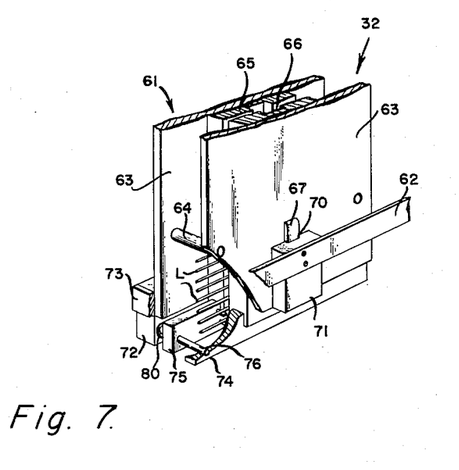
FIG. 7 is a perspective view rotated 180° from the showings in FIGS. 5 and 6 and showing the lower end of the component magazine in association with a retainer therefor.
Figure 8:
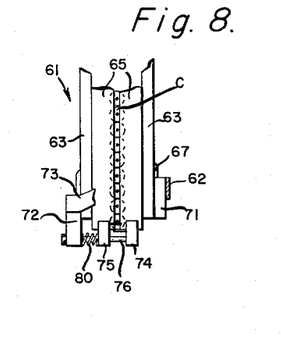
FIG. 8 is a fragmentary side elevational view, partially in section, showing the component magazine lower end portion and mechanism thereof for dispensing components therefrom.
Figure 9:
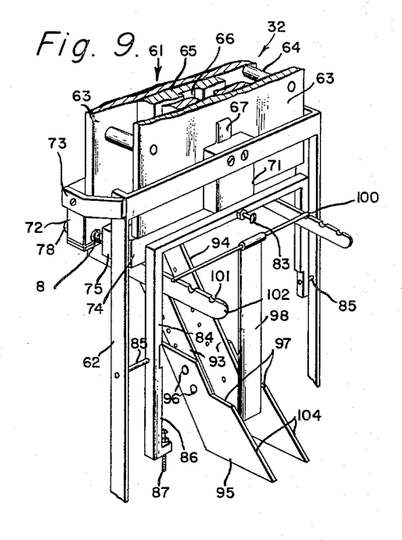
FIG. 9 is a perspective view showing one type of component dispenser operating mechanism of the present invention.

As the collector 31 is moved along the rail 45 by action of the chain 35 and the enlarged element 51 thereon, selected electronic components are dispensed from the dispensing apparatus 32 and specifically from component magazines 61. As shown in FIG. 1, the magazines 61 are carried on individual frame structures 62 that are connected to sides of the rail 45 and disposed in vertical positions spaced from and above the rail 45. The component magazines 61 are of a removable nature, thus to enable loading with components from positions remote from the machine and disposition at a later time in the machine. As shown in FIG. 5, a typical magazine 61 includes a pair of spaced side members 63 that are retained in spaced relationship by means of spacers 64. Each of the magazines has a pair of channel members 65 having channels 66. The channel members 65 are disposed in laterally aligned position and spaced relationship whereby to permit the components C to be disposed within the channels 66 and the leads L to extend laterally for disposition between opposed surfaces of the channel 65. This arrangement is shown in FIG. 6. The magazines 61 further include a vertically elongated guide member 67 that serves to locate the lower end thereof in the frame structure 62. A U-shaped pin 68 is disposed through suitable openings in the channel 65 and engages the leads of a lowermost component, thus temporarily to retain the components in the magazine. As shown in FIGS. 6 and 7, the magazines 61 are disposed in the frame structure 62 with the guide member 67 being disposed in alignment with a groove 70 in a block 71 carried by the frame structure. The opposite side of each of the magazines 61 carries a similar guide member 67 that is adapted for disposition in a similar groove in a backing plate 72. As shown in FIG. 9, the backing plate 72 is connected to the frame structure 62 by means of frame extensions 73.

Figure 11:
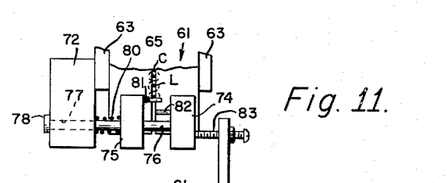
FIGS. 11, 12 and 13 are fragmentary side elevational views showing a series of steps in the operation of the component dispensing apparatus of this invention.
Figure 12:
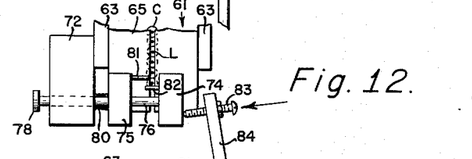
Figure 13:
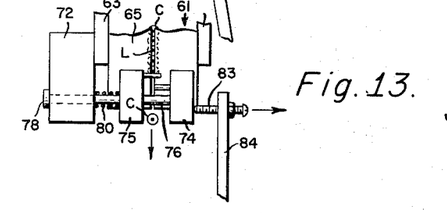

The frame structures 62 and the backing plates 72 carry component dispensing mechanism which includes a pair of laterally elongated component dispensing feed blocks 74 and 75. The blocks 74 and 75 are notched to receive the lower end of the magazines 61 and are carried on rods 76 that are secured to the blocks to maintain the blocks in spaced relationship and slidably disposed in suitable openings 77 in the backing block 72. The leads 76 are provided with heads 78 which engage an outer surface of the backing block 72 and compression springs 80 are disposed about the rods 76 and between the feed block 75 and an inner face of the backing block 72. The blocks 74 and 75 are each provided with pairs of outstanding pins 81 and 82 that are spaced vertically with respect to adjacent faces of the blocks 74 and 75. With reference to FIGS. 11, 12 and 13, as the blocks 74 and 75 are moved in opposition to the compression springs 80, the pins 81 and 82 are disposed on lateral sides of the channel members 65 and serve to support the leads of the components C. One reciprocal movement of the blocks 74 and 75 will transfer a single component from engagement of the leads thereof from the pins 81, as shown in FIG. 11, to engagement with the pins 82, as shown in FIG. 12. Return movement of the blocks 74 and 75 serves to dispense one of the components C from the magazine 61. As shown in FIGS. 9, 11, 12 and 13, the blocks 74 and 75 are reciprocated against the compression of the springs 80 by engagement thereof with an adjustable screw 83 carried by a lever 84 that is pivoted as by shafts 85 to the frame structure 82. The lever 84 is generally U-shaped with one arm portion 86 thereof extending downwardly from one of the pivot pins 85 and having an adjustable engaging member 87 carried thereby. The engaging member 87 is adapted for contact with the lug 55 that is carried by one of the plates 53 of the component collector 31 as the collector 31 is moved through the assembly machine.

Figure 10:
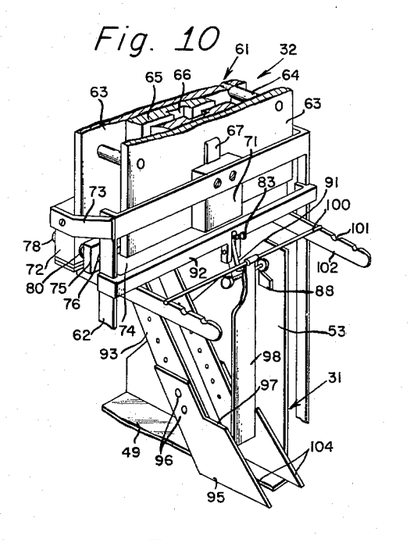
FIG. 10 is a perspective view similar to FIG. 9 showing a slightly modified type of component dispensing apparatus.

As shown in FIG. 10, other methods may be employed to reciprocate the blocks 74 and 75 and may include cam members 88 carried by inner surfaces of one of the plates 53 of the component collector 31, with the cam members 88 being adapted for engagement with rollers 90 carried by an end of a lever 91 that is pivotally mounted on a frame cross member 92. The lever 91 carries the adjustable screw 83 that is adapted for engagement with the feed block 74.

As shown in FIG. 9 and FIGS. 4 through 17, the backing block 72 serves to support a component guide structure including a pair of generally downwardly extending laterally spaced arms 93. The arms 93 have angularly disposed edges 94, there being end members 95 secured to the arms 93 as by bolts 96. Each of the end members 95 has a shoulder 97 with the vertical position of the shoulder 97 relative to the arms 93 being determined by selected configurations of the members 95 and the position of attachment of the end members 95 to the arms 93.

Figure 14:
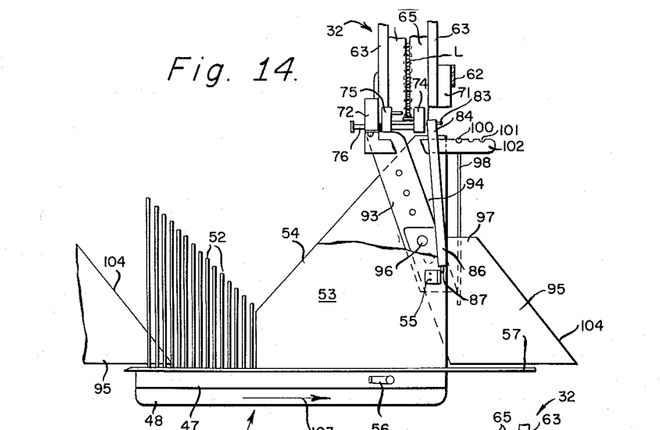
FIGS. 14, 15, 16 and 17 are fragmentary side elevational views showing the component mechanism, component dispensing apparatus and the association thereof with the movable component collector in successive steps in the operation thereof.
Figure 15:
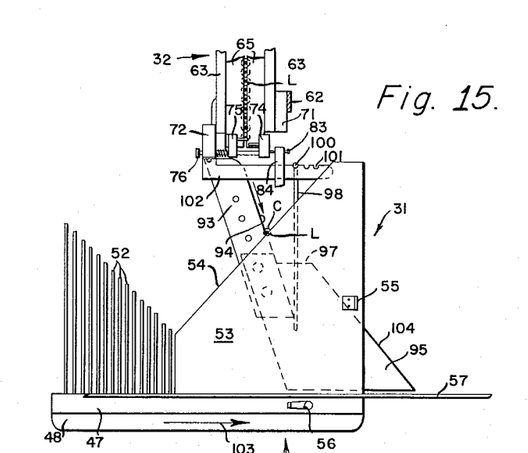
Figure 16:
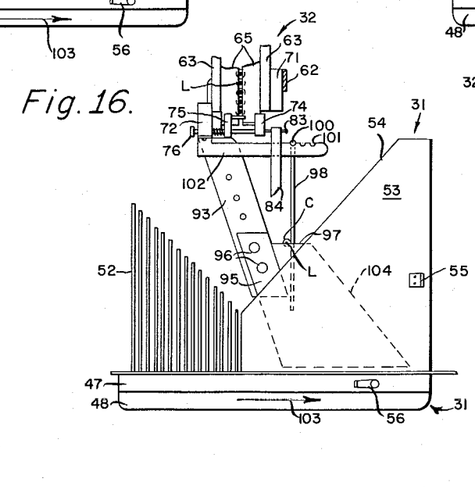
Figure 17:
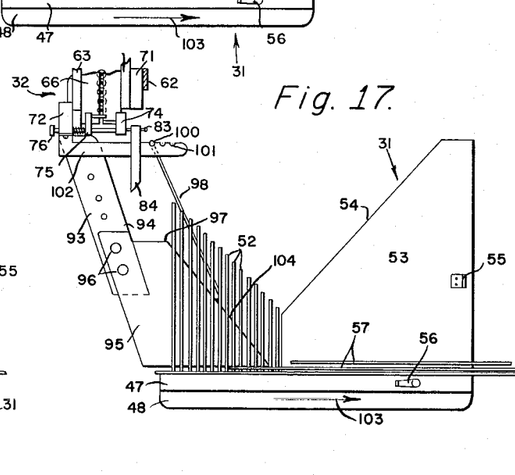

As a component C is dispensed from the magazine 61, the leads L of the component will engage the angular edges 94 of the arms 93 and will travel downwardly along these edges for engagement thereof with the shoulders 97 of the end members 95. The component is retained on the shoulders 97 by means of a freely hanging blade 98 that is carried by a rod 100 which is in turn disposed in one or the other of laterally aligned notches 101 in upper surfaces of arms 102. The arms 102 are secured to a lower surface of the backing block 72 and extend therefrom within the confines of the U-shaped lever member 85. Thus, each component is maintained on the shoulders 97 by engagement thereof with the blade 98. FIG. 14 illustrates the mechanism as the collector 31 is moved therethrough and at a time when the lug 55 engages the engaging member 87 of the lever 84, thus to dispense a single component from the magazine 61. As shown in FIG. 15, the leads L of the component C are guided along the edges 94 of the arms 93 by engagement thereof with the angular edges 54 of the plates 53 of the collector 31. FIG. 16 illustrates the position of the component C with the leads L thereof resting upon the shoulders 97 of the end members 95 and retained in this position by means of the blade 98. As the component collector 31 continues to move in the direction of the arrows 103, the vertical level of the shoulders 97 serve to dispose the component leads L between a selected pair of the vertically disposed rods 52 in the component collector 31. Thereafter, as shown in FIG. 17, the component C is gently lowered between these selected pairs of rods 52 by engagement thereof with angularly disposed edges 104 on the end members 95, until the leads of the component engage upper surfaces of selected longitudinally extending plates 57.

It may be seen and should be understood that each of the magazines 61 is associated with an arm arrangement 93 and end members 95 having shoulders 97 positioned at the desired vertical level whereby to dispose the leads of the components between the desired pairs of rods 52, thereby longitudinally to locate the components C between the rods 52. The vertical position of the components C and leads L thereof is determined by the level of the appropriate plates 57 on which the components are adapted to rest. As the collector 31 moves through the machine, the various components will be disposed between the selected rods 52 and positioned at the predetermined levels. In order that the present machine may be used for assembly of different types of cordwood modules, different components are installed in the various magazines and end members 95 having selected levels of the shoulders 97 are connected to the arms 93. When the machine is set up for the assembly of any one particular cordwood module, this same module may be manufactured in as large quantities as desired. Thereafter, the machine is simply converted by changing the end members 95 to suit the characteristics of the desired component arrangement in another cordwood module.

With reference again to FIG. 1, wherein many of the detail components of the present mechanism have been omitted for clarity, it is to be noted that there may be as many magazines 61 as desired and necessary for the manufacture of a particular cordwood module and there may be as many longitudinally extending plates 57 as necessary to establish the desired levels on which the components are established between the vertically disposed rods 52 of the component collector 31. When the component collector 31 has passed beneath all of the magazines 61, it is moved into the receiving station 33 and the chain 35 disengages from the tab 50. The receiving station 33 is shown in detail in FIGS. 18 and 20 and includes a channel base member 105 having a side member 106 and being pivotally mounted on a shaft 108 adjacent one end thereof. The shaft 108 carries a gear 109 that is adapted to be driven by a suitable motor and gear train 110 arranged in an enclosure 111. Upon operation of the motor 110, the constriction is such as to tilt the channel member 105 and components carried thereby from the position shown in FIG. 18 to the position shown in FIG. 20.

Figure 18:
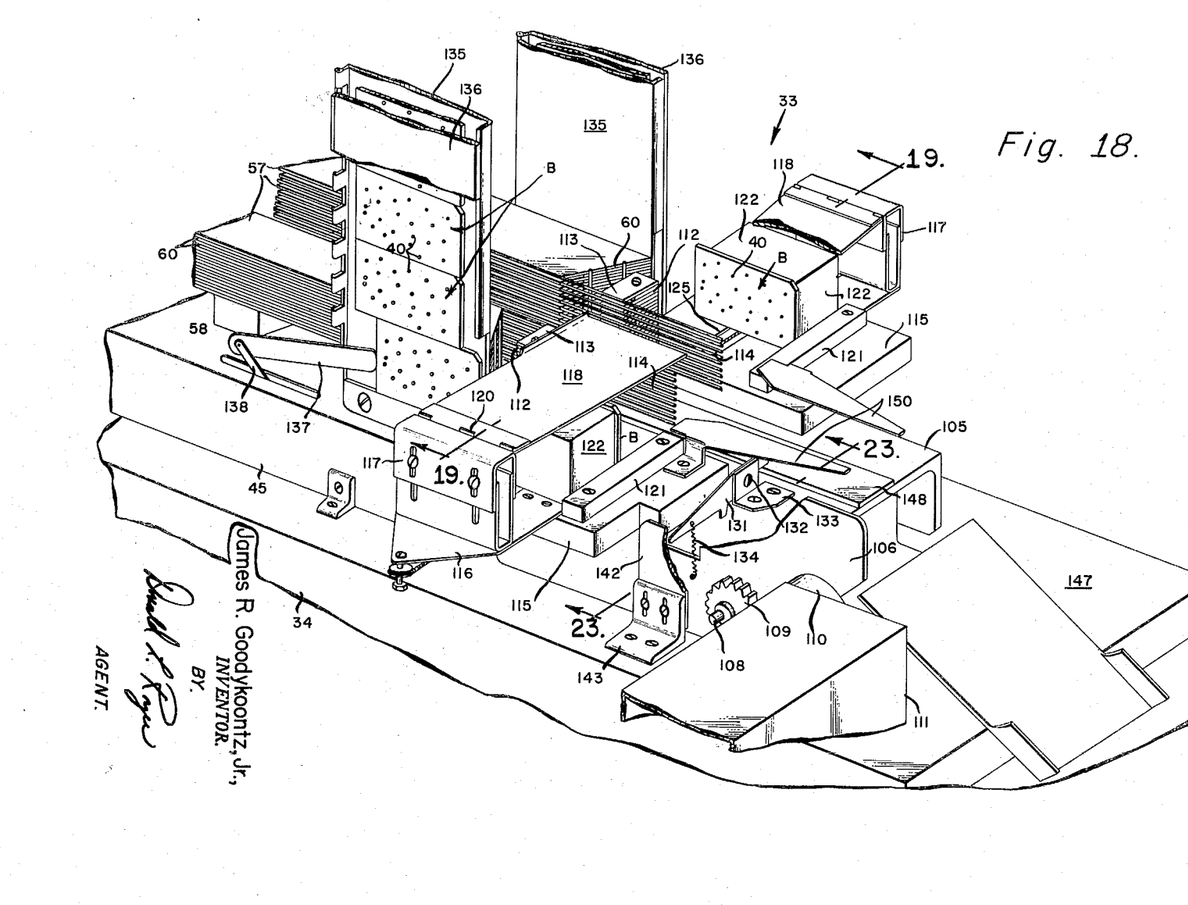
FIG. 18 is a fragmentary perspective view showing the collector receiving station and mechanism for disposing printed circuit boards in association with a plurality of circuit components, the components having been omitted for clarity.
Figure 19:
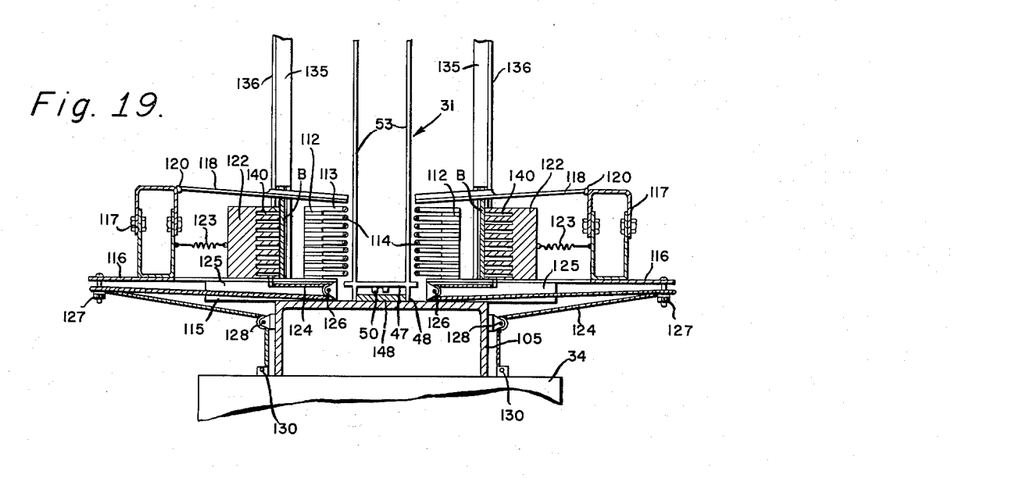
FIG. 19 is a transverse sectional view through the circuit board assembly apparatus as taken substantially as indicated by line 19—19, FIG. 18.
Figure 20:
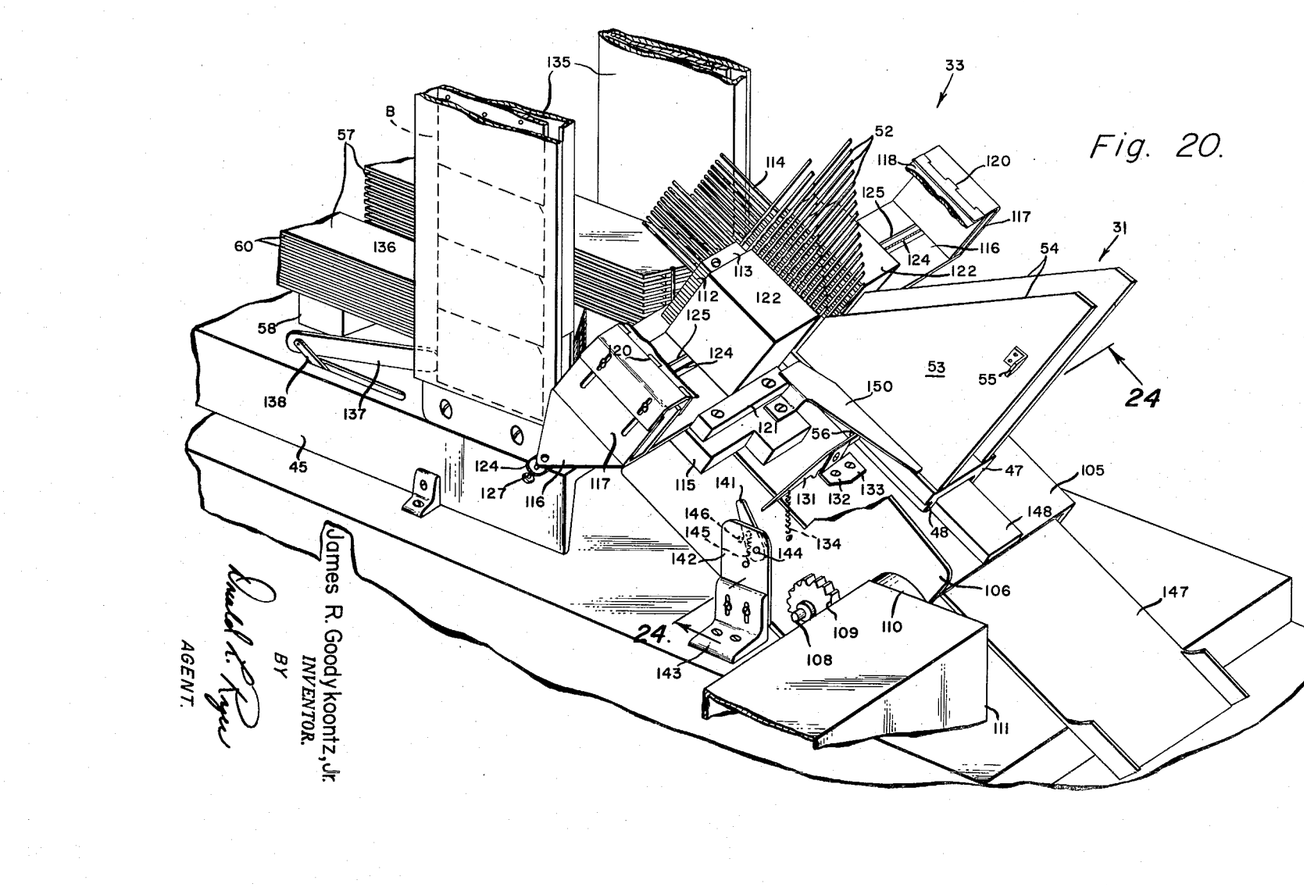
FIG. 20 is a fragmentary perspective view similar to FIG. 18 with elements being shown in different positions.

As shown, the channel member 105 serves to support a pair of pedestals 112 having a plurality of inwardly directed plates 113 stacked one upon the other with free ends of the plates being adapted to support a plurality of horizontally disposed parallel rods 114. The rods 114 are normally disposed in coextensive alignment with inner edges of the plurality of longitudinally extending plates 57 and terminate in free ends. Thus, when the component collector 31 is moved into the receiving station, the components carried between the rods 52 and on the upper surfaces of the plates 57 will be transferred from the plates 57 to the rods 114.

The channel member 105 serves further to support a pair of laterally extending support members 115 to which circuit board installing mechanism is attached. This circuit board installing mechanism includes laterally extending members 116 having vertically disposed adjustable height end structures 117. A flap 118 is hinged as at 120 to each of the end structures 117 and extends inwardly to a position substantially overlying the horizontally disposed rods 114. The support members 115 further carry stops 121 and a pair of ram members 122. The ram members 122 are normally biased toward the end structures 117 by means of tension springs 123 and each of the ram members 122 has a cable 124 attached to the lower surface thereof by means of a fitting disposed through a slot 125 in the support members 114. Each of the cables 124 extends about a pulley 126 positioned within the inner ends of the slots 125 and thereafter about another pulley 127 carried by an outer end of the members 116. Thereafter, the cable extends about a third pulley 128 carried by a side of the channel member 105 and is anchored as at 130 to the base structure 34. It may thus be seen that as the receiving station 33 is tilted from the position shown in FIG. 18 to the position shown in FIG. 20, the cables 124 will act to move the rams 122 in an inward direction and in opposition to the forces of the tension springs 123, this action being for a purpose to be hereinafter more fully described.

Figure 21:
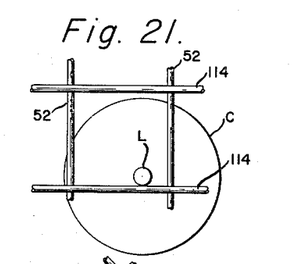
FIGS. 21 and 22 are enlarged fragmentary views showing the method for precisely aligning component leads in two dimensions.
Figure 22:
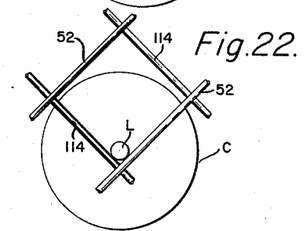
Figure 23:
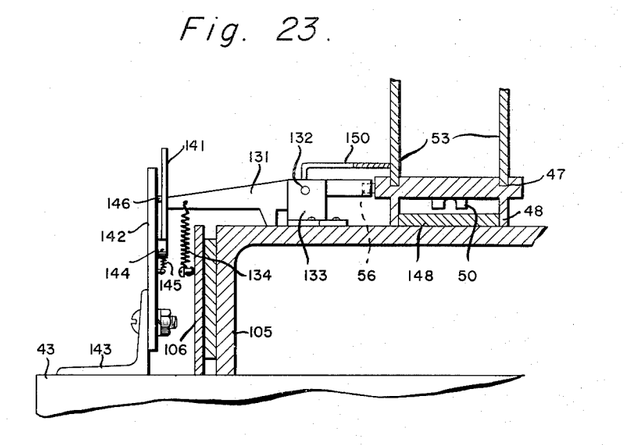
FIGS. 23 and 24 are enlarged fragmentary sectional views as taken approximately as indicated by the lines 23—23 and 24—24 of FIGS. 18 and 20 respectively.
Figure 24:
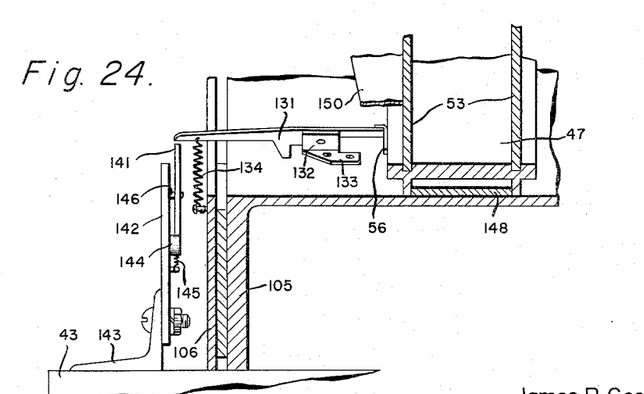

It is to be noted that the tilting operation of the channel member 105 and associated mechanism serves to dispose the rods 52 of the component carriage and the horizontally disposed rods 114 in such a manner as precisely to locate the component leads L. This function is shown in detail in FIGS. 21 and 22 with the components being assured of location at a junction between the rods 52 and 114, whereby to permit precise alignment thereof with the openings 40 in the circuit boards B. To accommodate any slight misalignment of the component leads L, the inner ends of the openings 40 in the circuit boards B may be suitably conically contoured.

As the component collector 31 is moved into the receiving station 33, the distance of movement therein is limited by engagement of the hook 56 carried by the side of the collector base 47 with the end of a lever 131. The lever 131 is pivotally mounted as at 132 to a bracket 133 that is in turn carried by the channel member 105 and is biased in one direction by means of a tension spring 134 disposed between an outer end of a lever 131 and the plate 106. The lever 131 engages the upper surface of the member 105 to limit movement thereof by action of the spring 134.

As shown in FIGS. 1, 18, 19 and 20, a pair of circuit board magazines 135 are positioned adjacent the ends of the longitudinal plates 57 and secured to the side portions of the stacks of elongated plates 57. Each of the magazines 135 has a hinge cover 136 and is adapted to contain a supply of circuit boards B. The boards B are adapted to be disposed ahead of the rams 122 when the rams are in their retracted position and by being pushed from the magazines 135 by means of a pusher 137 operated through a lever 138 which is in turn connected to a motor 139 (see FIG. 25), located beneath the base member 45. The boards B are retained in vertical position and against the inner faces of the rams 122 by engagement of the upper edge thereof with the flaps 118. The stop 121 serves to guide edges of the boards B. It is to be noted that the flaps 118 are suitably inclined whereby to bias the boards B into engagement with the faces of the rams 122. It is also to be noted that each of the rams 122 is provided with a plurality of openings 140 that are arranged in a continuous vertical and horizontal pattern in the face thereof. The boards B are also provided with a plurality of the openings 40 as described hereinbefore. For clarity, the boards B and the components C have been omitted from FIG. 20.

As shown in FIGS. 18, 20, 23 and 24, the outer end of the lever 131 is adapted for cooperation with a catch 141 carried by a bracket 142 that is adjustably mounted by an angle 143 to the base structure 34. The catch 141 is pivoted as at 144 to the bracket 142 and biased in one direction by means of a tension spring 145. The catch 141 is limited in movement by means of a pin 146 carried by the bracket 142. Thus, as the channel member 105 is tilted to the position shown in FIG. 20, the outer end of the lever 131 will move the catch 141 against the force of the spring 14 and, when the channel member 105 and associated structure carried thereby are moved in a direction from the position shown in FIG. 20 toward the position shown in FIG. 18, and upon downward movement thereof sufficient to permit withdrawal of the opening 140 in the rams 122 from the ends of the component leads L, the lever 131 will engage the catch 141 whereby to move the lever 131 in a direction opposed to the force of the spring 134 and disengage an inner end of the lever 131 from the hook 56 carried by the component collector base 47. The component collector will thereby be released and will slide from the channel member 105 onto a ramp 147 and onto the conveyor belt 36.

During movement of the component collector 31 over the channel member 105, the collector is guided by means of a rectangular guide member 148 mounted on the member 105 and which engages inner surfaces of the guides 48 of the component collector base 47. The collector is further guided by side guides 150 that are disposed upwardly from and carried by the supports 115.

Figure 25:
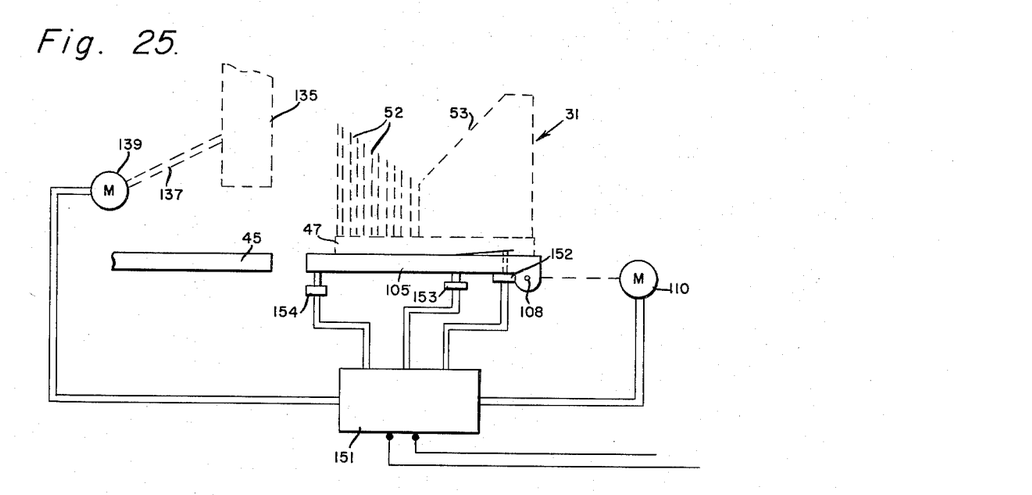
FIG. 25 is a diagrammatic view showing the sequence operating mechanism for apparatus employed in the collector receiving station of this invention.

With reference to the diagram of FIG. 25, it is to be noted that a plurality of switches are used and are interconnected through a suitable control box 151 to operate the motors 110 and 139. A switch 152 serves to energize the motor 110 when the component collector 31 is in position on the channel member 105. When the channel member 105 reaches its upper limits, a switch 153 will reverse the motor 110 and effect downward movement of the member 105, the motor being de-energized by means of a switch 154. This particular mechanism is shown relatively diagrammatically, inasmuch as structure of this type is common and within the skill of the routine designer familiar with this field.

As stated hereinbefore, following delivery of the component collector 31 to the conveyor 36, the operator grasps the two component boards between thumb and forefinger and removes the assembled module upwardly and from the rods 52; the module M is then placed on the conveyor 38 for transportation to a soldering station and the component collector 31 is placed upon the conveyor 37 for return to the initial end of the assembly machine.

It may thus be seen that circuit modules of the type shown in FIG. 2 may be completely and automatically assembled through three dimensional location of the components C and leads L thereof and disposition of these components in the desired manner in connection with openings in circuit boards B. The resulting module M is derived through no manual handling of any of the components thereof or the boards B and without the possibility of human error in the selection of proper components and disposition of such components in the openings of the boards B. These completed electronic modules are therefore manufactured in a minimum of time and at a minimum cost.

Having thus described the invention and the present embodiments thereof, it is desired to emphasize the fact that many further modifications may be resorted to in a manner limited only by a just interpretation of the following claims.

I claim:

1. In an apparatus for assembling axially leaded electronic components with a pair of parallel disposed circuit boards having holes therein, the combination of: a base structure; a track on said base structure; a component collector adapted for disposition on said track; mechanism for moving said collector along said track; a plurality of component magazines carried by said base structure and disposed in longitudinal spaced relationships above said track; mechanism responsive to engagement by said collector for releasing a component from each of said magazines; mechanism for transporting said released components to and for longitudinally positioning said component in said collector; mechanism carried by said base structure for vertically positioning said components in said collector; magazine mechanism for said circuit boards; means for moving said circuit boards from said magazine means to positions for engagement of said holes therein with leads of said components positioned in said collector; and mechanism for disengaging said collector from said moving mechanism therefor and conducting said collector from said assembly apparatus together with assembled modules of components and circuit boards.

2. In an apparatus for assembling axially leaded electronic components into a module with a pair of parallel disposed circuit boards having holes therein, the combination of: a base structure; a track on said base structure; a component collector adapted for disposition on said track; mechanism for moving said collector along said track; a plurality of component magazines carried by said base structure and disposed in longitudinal spaced relationships above said track; mechanism responsive to engagement by said collector for releasing a component from each of said magazines; mechanism for transporting said released components to and for longitudinally positioning said component in said collector; mechanism carried by said base structure for vertically positioning said components in said collector; a module assembly station; magazine means for said circuit boards; mechanism for moving said circuit boards from said magazine mechanism to said module assembly station and to positions for engagement of said holes therein with leads of said components positioned in said collector; and mechanism for disengaging said collector from said moving mechanism therefor and conducting said collector from said assembly apparatus together with assembled modules of components and circuit boards.

3. In an apparatus for assembling axially leaded electronic components with a pair of parallel disposed circuit boards having holes therein, the combination of: a base structure; a track on said base structure; a component collector adapted for disposition on said track; mechanism for moving said collector along said track; a plurality of component magazines carried by said base structure and disposed in longitudinal spaced relationships above said track; mechanism responsive to engagement by said collector for releasing a component from each of said magazines; mechanism for transporting said released components to and for longitudinally positioning said component in said collector; mechanism carried by said base structure for vertically positioning said components in said collector; mechanism for positively locating said component leads both longitudinally and vertically; magazine means for said circuit boards; mechanism for moving said circuit boards from said magazine means to positions for engagement of said holes therein with said leads of said components positioned in said collector; and mechanism for disengaging said collector from said moving mechanism therefor and conducting said collector from said assembly apparatus together with assembled modules of components and circuit boards.

4. In an apparatus for assembling axially leaded electronic components into a module with a pair of parallel disposed circuit boards having holes therein, the combination of: a base structure; a track on said base structure; a component collector adapted for disposition on said track; mechanism for moving said collector along said track; a plurality of component magazines carried by said base structure and disposed in longitudinal spaced relationships above said track; mechanism responsive to engagement by said collector for releasing a component from each of said magazines; mechanism for transporting said released components to and for longitudinally positioning said component in said collector; mechanism carried by said base structure for vertically positioning said components in said collector; mechanism for positively locating said component leads both longitudinally and vertically; a module assembly station; magazine mechanism for said circuit boards; mechanism for moving said circuit boards from said magazine means to said module assembly station and to positions for engagement of said holes therein with said leads of said components positioned in said collector; and mechanism for disengaging said collector from said moving mechanism therefor and conducting said collector from said assembly apparatus together with assembled modules of components and circuit boards.

5. In an apparatus for assembly axially leaded electronic components into a module with a pair of parallel disposed circuit boards having holes therein, the combination of: a base structure; a track on said base structure; a component collector adapted for disposition on said track and having rows of a plurality of vertically disposed spaced fingers; mechanism for continuously moving said collector along said track; a plurality of component magazines carried by said base structure and disposed in longitudinal spaced relationships above said track; mechanism responsive to engagement by said collector for releasing a component from each of said magazines; mechanism for transporting said released components to and for longitudinally positioning leads of said component between selected fingers of said collector; mechanism carried by said base structure for vertically positioning said components in said collector; magazine mechanism for said circuit boards; mechanism for moving said circuit boards from said magazine means to positions for engagement of said holes therein with said leads of said components positioned in said collector; and mechanism for disengaging said collector from said moving mechanism therefor and conducting said collector from said assembly apparatus together with assembled modules of components and circuit boards.

6. In an apparatus for assembling axially leaded electronic components into a module with a pair of parallel disposed circuit boards having holes therein, the combination of: a base structure; a track on said base structure; a component collector adapted for disposition on said track and having rows of a plurality of vertically disposed spaced fingers; mechanism for continuously moving said collector along said track; a plurality of component magazines carried by said base structure and disposed in longitudinal spaced relationships above said track; mechanism responsive to engagement by said collector for releasing a component from each of said magazines; mechanism for transporting said released components to and for longitudinally positioning leads of said component between selected fingers of said collector; mechanism carried by said base structure for vertically positioning said components in said collector; mechanism for positively locating said component leads both longitudinally and vertically; a module assembly station; magazine means for said circuit boards; means for moving said circuit boards from said magazine means to said module assembly station and to positions for engagement of said holes therein with said leads of said components positioned in said collector; and mechanism for disengaging said collector from said moving mechanism therefor and conducting said collector from said assembly apparatus together with assembled modules of components and circuit boards.

7. An automatic electronic component circuit module assembly apparatus for modules having substantially parallel printed circuit boards with axially leaded electronic components disposed normal between said boards and component leads extending through openings in said boards for cooperation with printed circuits carried by said boards, said assembly apparatus comprising: a component collector having a pair of parallel rows of rods disposed vertically therefrom; a base structure for said apparatus; mechanism carried by said base structure for moving said collector therealong; a plurality of vertical level establishing plates carried by said base structure and positioned laterally adjacent a line of travel of said collector therealong; mechanism carried by said base structure and responsive to engagement by said collector for depositing selected electronic components between selected pairs of said vertical rods of said collector, leads of said components being adapted for disposition on selected pairs of said level establishing plates; a circuit board assembly station positioned at one end of said line of travel of said collector; horizontal rod means for receiving said components from said plates and for maintaining said vertical level of said components in said station; mechanism for tilting said station whereby precisely to establish vertical and horizontal alignment of said component leads between said vertical and horizontal rods; ram means in said station and responsive to said tilting thereof for moving circuit boards into engagement with said component leads; mechanism carried by said base structure for depositing said circuit boards in position relative to said ram mechanism; and mechanism for releasing said collector and the assembled circuit module from said assembly station.

8. An automatic electronic component circuit module assembly apparatus for modules having substantially parallel printed circuit boards with axially leaded electronic components disposed normal between said boards and component leads extending through openings in said boards for cooperation with printed circuits carried by said boards, said assembly apparatus comprising: a component collector having a pair of parallel rows of rods disposed vertically therefrom; a base structure for said apparatus; mechanism carried by said base structure for moving said collector therealong; a plurality of vertical level establishing plates carried by said base structure and positioned laterally adjacent a line of travel of said collector therealong; mechanism carried by said base structure and responsive to engagement by said collector for depositing selected electronic components between selected pairs of said vertical rods of said collector, said component depositing mechanism including inclined guide means on said collector and said depositing mechanism for gradually lowering said components to said disposition between said selected pairs of rods, leads of said components being adapted for disposition on selected pairs of said level establishing plates; a circuit board assembly station positioned at one end of said line of travel of said collector; horizontal rod means for receiving said components from said plates and for maintaining said vertical level of said components in said station; mechanism for tilting said station whereby precisely to establish vertical and horizontal alignment of said component leads between said vertical and horizontal rods; ram means in said station and responsive to said tilting thereof for moving circuit boards into engagement with said component lead; mechanism carried by said base structure for depositing said circuit boards in position relative to said ram mechanism; and mechanism for releasing said collector and the assembled circuit module from said assembly station.

9. An automatic electronic component circuit module assembly apparatus for modules having substantially parallel printed circuit boards with axially leaded electronic components disposed normal between said boards and component leads extending through openings in said boards for cooperation with printed circuits carried by said boards, said assembly apparatus comprising: a component collector having a pair of parallel rows of rods disposed vertically therefrom; a base structure for said apparatus; endless chain means carried by said base structure for continuously moving said collector therealong; a plurality of vertical level establishing plates carried by said base structure and positioned laterally adjacent a line of travel of said collector therealong; mechanism carried by said base structure and responsive to engagement by said collector for depositing selected electronic components between selected pairs of said vertical rods of said collector, leads of said components being adapted for disposition on selected pairs of said level establishing plates; a circuit board assembly station positioned at one end of said line of travel of said collector; horizontal rod means for receiving said components from said plates and for maintaining said vertical level of said components in said station; mechanism for tilting said station whereby precisely to establish vertical and horizontal alignment of said component leads between said vertical and horizontal rods; ram means in said station and responsive to said tilting thereof for moving circuit boards into engagement with said component leads; mechanism carried by said base structure for depositing said circuit boards in position relative to said ram means; flap means disposed above said ram means for maintaining said circuit boards in contact with said ram means; and mechanism responsive to downward movement of said station for releasing said collector and the assembled circuit module from said assembly station.

10. An automatic electronic component circuit module assembly apparatus for modules having substantially parallel printed circuit boards with axially leaded electronic components disposed normal between said boards and component leads extending through openings in said boards for cooperation with printed circuits carried by said boards, said assembly apparatus comprising: a component collector having a pair of parallel rows of rods disposed vertically therefrom; a base structure for said apparatus; mechanism carried by said base structure for moving said collector therealong; a plurality of vertical level establishing plates carried by said base structure and positioned laterally adjacent a line of travel of said collector therealong; plural magazine means carried by said base structure and having dispensing means responsive to engagement by said collector for depositing selected electronic components between selected pairs of said vertical rods of said collector, said component depositing means including inclined guide means on said collector and said depositing means for gradually lowering said components to said disposition between said selected pairs of rods, leads of said components being adapted for disposition on selected pairs of said level establishing plates; a circuit board assembly station positioned at one end of said line of travel of said collector; horizontal rod means for receiving said components from said plates and for maintaining said vertical level of said components in said station; mechanism for tilting said station whereby precisely to establish vertical and horizontal alignment of said component leads between said vertical and horizontal rods; ram means in said station and responsive to said tilting thereof for moving circuit boards into engagement with said component leads; mechanism carried by said base structure for depositing said circuit boards in position relative to said ram means; and mechanism for releasing said collector and the assembled circuit module from said assembly station.

11. An automatic electronic component circuit module assembly apparatus for modules having substantially parallel printed circuit boards with axially leaded electronic components disposed normal between said boards and component leads extending through openings in said boards for cooperation with printed circuits carried by said boards, said assembly apparatus comprising: a component collector having a pair of parallel rows of rods disposed vertically therefrom; a base structure for said apparatus; endless chain means carried by said base structure for continuously moving said collector therealong; a plurality of vertical level establishing plates carried by said base structure and positioned laterally adjacent a line of travel of said collector therealong; plural magazine means carried by said base structure and having dispensing means responsive to engagement by said collector for depositing selected electronic components between selected pairs of said vertical rods of said collector, said component depositing means including inclined guide means on said collector and said depositing means for gradually lowering said components to said disposition between said selected pairs of rods, leads of said components being adapted for disposition on selected pairs of said level establishing plates; a circuit board assembly station positioned at one end of said line of travel of said collector; horizontal rod means for receiving said components from said plates and for maintaining said vertical level of said components in said station; mechanism for tilting said station whereby precisely to establish vertical and horizontal alignment of said component leads between said vertical and horizontal rods; ram means in said station and responsive to said tilting thereof for moving circuit boards into engagement with said component leads; mechanism carried by said base structure for depositing said circuit boards in position relative to said ram means; flap means disposed above said ram means for maintaining said circuit boards in contact with said ram mechanism; and mechanism responsive to downward movement of said station for releasing said collector and the assembled circuit module from said assembly station.

12. An electronic component dispensing, guiding and alignment apparatus comprising: a base structure; a component collector movable along said base structure; mechanism for moving said collector; a pair of parallel rows of a plurality of spaced rods disposed vertically from said collector, said rods having stepped upper ends; a pair of plates carried by said collector and disposed in coextensive alignment with said rows of rods, said plates having angularly disposed edges; a component magazine disposed vertically above said base structure and a line of travel of said collector therealong; a component dispensing mechanism positioned in operative association with a lower end of said magazine; lever means carried by said dispensing mechanism and engageable with said collector for actuating said mechanism whereby to dispense a single component from said magazine; angularly disposed guide arms carried by said dispensing mechanism and positioned for laterally disposed cooperation with said angularly disposed edges of said plates, said component being received by a junction of said arms and said plates whereby to transport said component gradually downwardly; shoulder means carried by said arms, said component being lowered to said shoulder means and maintained thereon for disposition between selected pairs of said rods in said rows thereof; and additional angularly disposed edges on said arms for gradually lowering said component between said pairs of rods.

13. An electronic component dispensing, guiding and alignment apparatus comprising: a base structure; a component collector movable along said base structure; mechanism for moving said collector; a pair of parallel rows of a plurality of spaced rods disposed vertically from said collector, said rods having stepped upper ends; a pair of plates carried by said collector and disposed in coextensive alignment with said rows of rods, said plates having angularly disposed edges; a component magazine disposed vertically above said base structure and a line of travel of said collector therealong; a component dispensing mechanism positioned in operative association with a lower end of said magazine; lever means carried by said dispensing mechanism and engageable with said collector for actuating said mechanism whereby to dispense a single component from said magazine; angularly disposed guide arms carried by said dispensing mechanism and positioned for laterally disposed cooperation with said angularly disposed edges of said plates, said component being received by a junction of said arms and said plates whereby to transport said component gradually downwardly; shoulder means carried by said arms, said component being lowered to said shoulder means and maintained thereon for disposition between selected pairs of said rods in said rows thereof; additional angularly disposed edges on said arms for gradually lowering said component between said pairs of rods; and plural horizontally disposed plate means having stepped longitudinal ends and carried by said base structure laterally adjacent said line of travel of said collector, said components being adapted for disposition on upper surfaces of said horizontally disposed plate means whereby to locate said components vertically between said rods.

14. An electronic component dispensing, guiding and alignment apparatus comprising: a base structure; a component collector movable along said base structure; mechanism for moving said collector; a pair of parallel rows of a plurality of spaced rods disposed vertically from said collector, said rods having stepped upper ends; a pair of plates carried by said collector and disposed in coextensive alignment with said rows of rods, said plates having angularly disposed edges; a removable component magazine disposed vertically above said base structure and a line of travel of said collector therealong; a component dispensing mechanism carried by said base structure and positioned in operative association with a lower end of said magazine; lever means carried by said dispensing mechanism and engageable with said collector for actuating said dispensing mechanism whereby to dispense a single component from said magazine; a pair of angularly disposed guide arms carried by said dispensing mechanism and positioned for laterally disposed cooperation with said angularly disposed edges of said plates, said component being received by a junction of said arms and said plates whereby to transport said component gradually downwardly; removable end portions on said arms; shoulder means carried by said end portions of said arms, said component being lowered to said shoulder means and maintained thereon for disposition between selected pairs of said rods in said rows thereof; and additional angularly disposed edges on said end portions of said arms for gradually lowering said component between said pairs of rods.

15. An electronic component dispensing, guiding and alignment apparatus comprising: a base structure; a component collector movable along said base structure; mechanism for moving said collector; a pair of parallel rows of a plurality of spaced rods disposed vertically from said collector, said rods having stepped upper ends; a pair of plates carried by said collector and disposed in coextensive alignment with said rows of rods, said plates having angularly disposed edges; a removable component magazine disposed vertically above said base structure and a line of travel of said collector therealong; a component dispensing mechanism carried by said base structure and positioned in operative association with a lower end of said magazine; lever means carried by said dispensing mechanism and engageable with said collector for actuating said dispensing mechanism whereby to dispense a single component from said magazine; a pair of angularly disposed guide arms carried by said dispensing mechanism and positioned for laterally disposed co-operation with said angularly disposed edges of said plates, said component being received by a junction of said arms and said plates whereby to transport said component gradually downwardly; removable end portions on said arms; shoulder means carried by said end portions of said arms, said component being lowered to said shoulder means and maintained thereon for disposition between selected pairs of said rods in said rows thereof; additional angularly disposed edges on said end portions of said arms for gradually lowering said component between said pairs of rods; and plural horizontally disposed plate means having stepped longitudinal ends and carried by said base structure laterally adjacent said line of travel of said collector, said components being adapted for disposition on upper surfaces of said horizontally disposed plate means whereby to locate said components vertically between said rods.

References Cited in the file of this patent

UNITED STATES PATENTS

| | | |
|---|---|---|
| 2,698,692 | Jones | Jan. 4, 1955 |
| 2,743,512 | Moyer | May 1, 1956 |
| 2,760,892 | Gonsett | Aug. 28, 1956 |
| 2,772,416 | Dorosz | Dec. 4, 1956 |
| 2,870,728 | Goodykoontz | Jan. 27, 1959 |